(12) United States Patent
Sahni et al.

(10) Patent No.: US 7,633,886 B2
(45) Date of Patent: Dec. 15, 2009

(54) SYSTEM AND METHODS FOR PACKET FILTERING

(75) Inventors: Sartaj Kumar Sahni, Gainesville, FL (US); Haibin Lu, Columbia, MO (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 737 days.

(21) Appl. No.: 11/027,164

(22) Filed: Dec. 30, 2004

(65) Prior Publication Data

US 2005/0163122 A1   Jul. 28, 2005

Related U.S. Application Data

(60) Provisional application No. 60/533,833, filed on Dec. 31, 2003.

(51) Int. Cl.
*H04L 12/28* (2006.01)
(52) U.S. Cl. .................. 370/254; 370/255; 370/256; 370/389
(58) Field of Classification Search .................. None
See application file for complete search history.

(56) References Cited

U.S. PATENT DOCUMENTS

| | | | |
|---|---|---|---|
| 4,606,002 A | 8/1986 | Waisman et al. | |
| 4,910,669 A | 3/1990 | Gorin et al. | |
| 5,212,587 A | 5/1993 | Healey | |
| 5,218,696 A | 6/1993 | Baird et al. | |
| 5,265,244 A | 11/1993 | Ghosh et al. | |
| 5,613,105 A | 3/1997 | Zbikowski et al. | |
| 5,644,763 A | 7/1997 | Roy | |
| 5,680,566 A | 10/1997 | Peng et al. | |
| 5,752,243 A | 5/1998 | Reiter et al. | |
| 5,758,360 A | 5/1998 | Zbikowski et al. | |
| 5,893,931 A | 4/1999 | Peng et al. | |
| 5,903,888 A | 5/1999 | Cohen et al. | |
| 6,144,957 A | 11/2000 | Cohen et al. | |
| 6,374,232 B1 | 4/2002 | Dageville et al. | |
| 6,445,709 B1 * | 9/2002 | Chiang | 370/399 |
| 6,526,055 B1 * | 2/2003 | Perlman et al. | 370/392 |

(Continued)

FOREIGN PATENT DOCUMENTS

EP        0124097        11/1984

(Continued)

OTHER PUBLICATIONS

Degermark, M., et al., "Small Forwarding Tables for Fast Routing Lookups", ACM SIGCOMM, pp. 3-14, 1997.

(Continued)

*Primary Examiner*—Robert W Wilson
(74) *Attorney, Agent, or Firm*—Saliwanchik, Lloyd & Saliwanchik

(57) ABSTRACT

A system for classifying data packets transmitted over a data communications network based upon a set of predetermined prefixes associated with destination addresses of the data packets is provided. The includes a data structure stored in an electronic memory. The data structure is a prefix-in-B-tree (PIBT) data structure and/or a range-in-B-tree (RIBT) data structure, the at least one data structure comprising a plurality of nodes based upon the set of predetermined prefixes. The system also includes a determination module for determining a match between one or more of the plurality of nodes and a destination address of a particular data packet.

16 Claims, 10 Drawing Sheets

U.S. PATENT DOCUMENTS

| | | | |
|---|---|---|---|
| 6,591,269 | B1 | 7/2003 | Ponnekanti |
| 6,788,695 | B1 | 9/2004 | Nagasawa |
| 7,054,315 | B2 * | 5/2006 | Liao .......................... 370/392 |
| 7,188,211 | B2 * | 3/2007 | Roth et al. .................. 711/108 |
| 2003/0078923 | A1 | 4/2003 | Voss et al. |
| 2003/0123397 | A1 * | 7/2003 | Lee et al. .................... 370/256 |
| 2005/0091443 | A1 * | 4/2005 | Hershkovich et al. ....... 711/100 |

FOREIGN PATENT DOCUMENTS

| | | |
|---|---|---|
| EP | 0235525 | 9/1987 |
| EP | 1063827 * | 12/2000 |
| JP | 02227735 | 9/1990 |
| JP | 04156624 | 5/1992 |
| WO | WO 03/042780 | 5/2003 |

OTHER PUBLICATIONS

Ergun, F., et al., "A Dynamic Lookup Scheme for Bursty Access Patterns", IEEE INFOCOM, 2001.

Gupta, P., et al., "Dynamic Algorithms With Worst-Case Performance for Packet Classification", IFIP Networking, 2000.

Lampson, B., et al., "IP Lookups Using Multiway and Multicolumn Search", IEEE INFOCOM 98, May 11, 1998.

Srinivasan, V., et al., "Faster IP Lookups Using Controlled Prefix Expansion", ACM Trans. on Computer Systems, Nov. 5, 1997.

Nilsson, S., et al., "Fast Address Look-Up for Internet Routers", IEEE Broadband Communications, 1998 and Proc. of Alg. and Exp., Feb. 1998.

Sahni, S., et al., "Efficient Construction of Fixed-Stride Multibit Tries for IP Lookup", 8th IEEE Workshop on Future Trends of Dist. Comp. Sys., 2001.

Sahni, S., et al., "Efficient Construction of Variable-Stride Multibit Tries for IP Lookup", Proc. IEEE Sym. on Apps. & the Internet (SAINT), pp. 220-227, 2002.

Suri, S., et al., "Multiway Range Trees: Scalable IP Lookup With Fast Updates", Globecom 2001.

Waldvogel, M., et al., "Scalable High Speed IP Routing Lookups", ACM SIGCOMM, pp. 25-36, 1997.

Sahni, S., et al., "Data Structures for One-Dimensional Packet Classification Using Most-Specific-Rule Matching", ISPAN, pp. 3-14, 2002.

Sahni, S., et al., "An O(log n) Dynamic Router-Table Design", IEEE Sym. on Computers & Communications, 2002.

Lu, H., et al., "O(log n) Dynamic Router-Tables for Prefixes and Ranges", IEEE Trans. on Computers, vol. 53, No. 10, pp. 1217-1230, Oct. 2004.

Doeringer, W., et al., "Routing on Longest-Matching Prefixes", IEEE/ACM Transactions on Networking, vol. 4, No. 1, pp. 86-97, Feb 1996.

Ruiz-Sanchez, M., et al., "Survey & Taxonomy of IP Address Lookup Algorithms", IEEE Network, vol. 15, No. 2, pp. 8-23, Mar./Apr. 2001.

Sklower, K., "A Tree-Based Routing Table for Berkeley Unix", Tech. Report, UC Berkeley, 1993.

* cited by examiner

200

| Prefix Name | Prefix | Range Start | Range Finish |
|---|---|---|---|
| P1 | 001* | 4 | 7 |
| P2 | 00* | 0 | 7 |
| P3 | 1* | 16 | 31 |
| P4 | 01* | 8 | 15 |
| P5 | 10111 | 23 | 23 |
| P6 | 0* | 0 | 15 |

FIG. 2

SYSTEM AND METHODS FOR PACKET FILTERING

CROSS REFERENCE TO RELATED APPLICATIONS

This application claims the benefit of U.S. Provisional Application No. 60/533,833, filed in the United States Patent and Trademark Office on Dec. 31, 2003, the entirety of which is incorporated herein by reference.

STATEMENT REGARDING FEDERALLY SPONSORED RESEARCH OR DEVELOPMENT

The United States Government has certain rights in this invention pursuant to National Science Foundation Grant No. CC4-991-2395.

BACKGROUND

1. Field of the Invention

The present invention is related to the field of data communications networks, and, more particularly, to the classification of packets and flows within a data communications network.

2. Description of the Related Art

Communication over the Internet and other data communication networks typically involves the transmission of "packetized" message segments. Packetized message segments are discrete packets of information that are separately transmitted from a source host to a destination host through various intermediate nodes, or network routers. Depending on various factors, such as network congestion, different packets carrying portions of the same underlying message may be routed to the destination over different paths. It is the task of the routers to direct each packet so that it efficiently reaches its proper destination. Increasingly, routers are used to effect various actions that are to be taken in handling packets transmitted over a data communication network. This typically requires that the packets be classified according to predefined criteria.

A router can classify incoming packets based upon information contained in each packet's header and information provided in the router's own table of classification rules referred to as a router table. The router table provides a set of rules whose form can be generalized by the 2-tuple, (F,A), where F represents a filter and A represents a corresponding action. The action element specifies the particular action to be performed when the packet information matches the corresponding filter. For example, a filter can be composed of fields that represent the packet's source address, its destination address, a particular protocol, and a port number. If the fields match the corresponding ones of the packet's header, then the rule specifies the action to be taken. The action can, for example, dictate that a packet be dropped, that the packet be forwarded along a specific output link, or that a specified amount of bandwidth be reserved. Thus, packet classification, broadly described, is the process of finding a match and, based on the match, determining which rule-dictated action is to be taken regarding the particular packet.

It can occur that a router table contains more than one filter component that matches the information contained in a packet's header. Accordingly, it is typically necessary for the sake of efficient routing of data packets to have some way of resolving a conflict due to a multiplicity of matches. One technique is to assign each rule a priority and select from among several conflicting matches the rule that has the highest priority.

With respect to routing a data packet based upon a destination address in the packet's header, the filters of the router table typically comprise binary strings referred to as prefixes that are compared to a binary string representing the destination address. In this context, conflict resolution operates by assigning a highest priority to the filter that has the most bits, or "longest prefix," matching the binary string of the destination address.

Various data structures based on router table rules have been constructed to facilitate the classification of data packets as described. Conventional data structures, though, often suffer from drawbacks. These drawbacks include excessive cache misses during insert and delete operations that may be needed to update the data structure based on changes in the underlying router table. Other drawbacks include excessive memory usage, as when, for example, the data structure uses multiple memory locations to store an identical element. Accordingly, there is yet lacking an effective and efficient data structure for classifying data packets transmitted over a data communications network.

SUMMARY OF THE INVENTION

The present invention provides a system and data structures for classifying data packets offering advantages in terms of resolution of multiple matches, memory requirements for the data structure, and updating of the data structure in response to changes in the underlying router table.

A system according to one embodiment of the present invention is directed to classifying data packets transmitted over a data communications network based upon a set of predetermined prefixes associated with destination addresses of the data packets. The system can include a prefix-in-B-tree (PIBT) data structure comprising a plurality of nodes. The system also can include a determination module for determining a match between at least one of the plurality of nodes of the PIBT data structure and a destination address of a particular data packet. According to another embodiment of the invention the system also can include an update module for modifying the PIBT data structure in accordance with changes in the underlying set of predetermined prefixes A system for classifying data packets transmitted over a data communications network according to yet another embodiment can include a range-in-B-tree (RIBT) data structure comprising a plurality of nodes. The system also can include a determination module for determining a match between at least one of the plurality of nodes of the RIBT data structure and a destination address of a particular data packet. According to yet another embodiment of the invention the system also can include an update module for modifying the RIBT data structure in accordance with changes in the underlying set of predetermined prefixes.

BRIEF DESCRIPTION OF THE DRAWINGS

There are shown in the drawings, embodiments which are presently preferred, it being understood, however, that the invention is not limited to the precise arrangements and instrumentalities shown.

FIG. 2 is an exemplary table of prefixes based upon a representative router table.

DETAILED DESCRIPTION OF THE INVENTION

Figure 1:
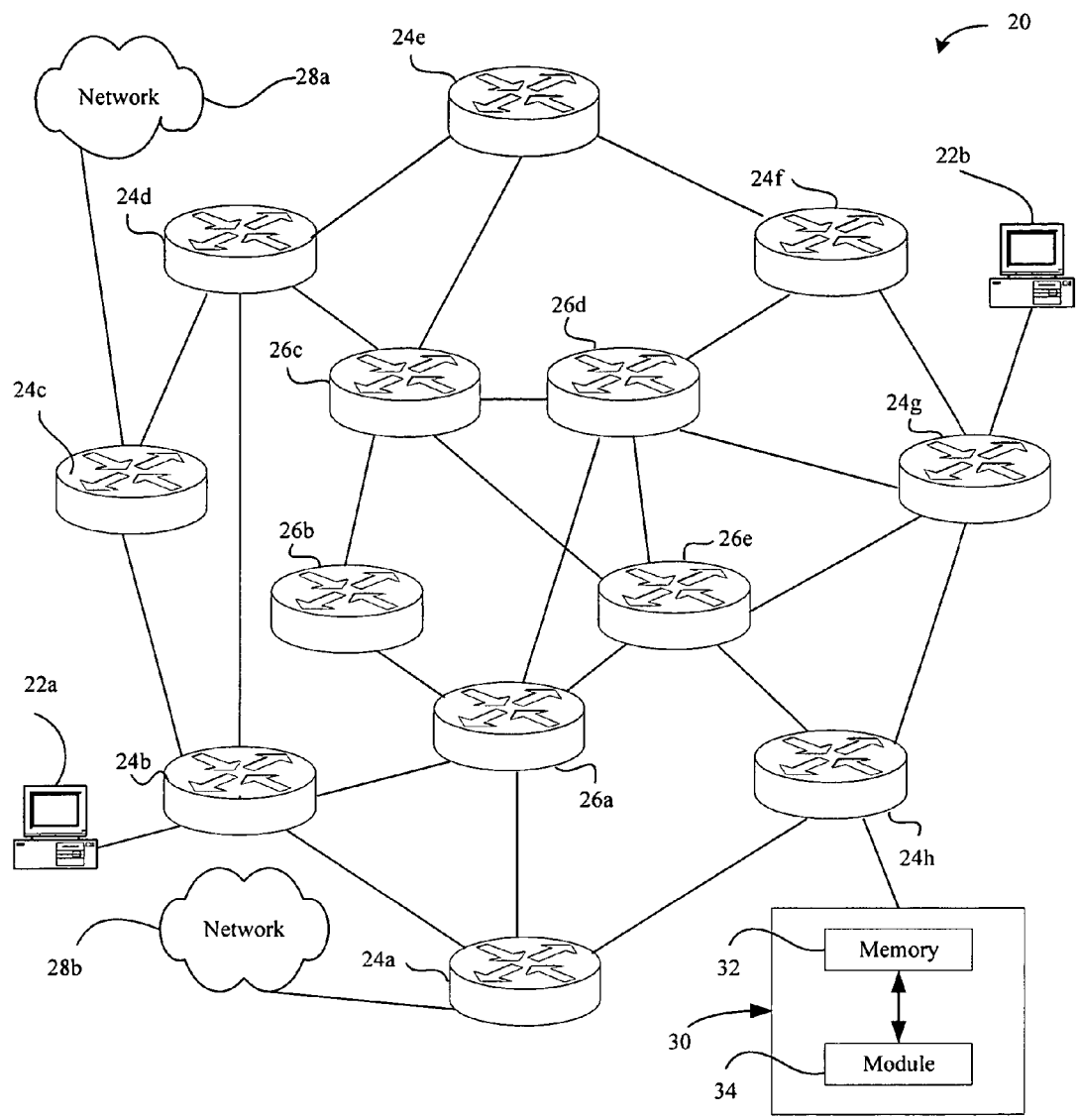
FIG. 1 is schematic diagram of a data communications network including a system for classifying data packets and flows according to one embodiment of the present invention.

FIG. 1 schematically illustrates an exemplary data communication network 20 having a plurality of hosts 22a, 22b, a plurality of edge nodes 24a-h and core nodes 26a-e with which the hosts are interconnected, a pair of additional networks 28a, 28b connected to the nodes, and a system 30, according to one embodiment of the present invention, connected to one of the nodes. The data communication network 20 can be a relatively small network such a local area network (LAN), or, alternately, can be an interconnection of a plurality of networks, such as the Internet. Each node can be a specific-purpose routing device, such as router, hub, or bridge. Instead, a node can be a general purpose computer on which routing software is configured to run.

Packets of data are routed among the hosts 22a, 22b and/or other networks 28a, 28b in the data communication network 20 via the nodes 24a-h, 26a-e of the network. The data packets are routed throughout the data communication network 20 using a plurality of filter-action pairs, defining packet classification rules, stored in a rule table that typically resides at each of the plurality of nodes 24a-h, 26a-e.

As illustrated, the system 30 connects to a node 24h of the data communication network 20 and facilitates packet routing by performing packet classifications as described herein. The system 30 can comprise a separate component connected with the node 24h, or, alternatively, the system can be contained in the node. Moreover, the system 30 can be implemented with one or more hardwired, dedicated circuits. Alternately, the system 30 can be implemented with processing instructions written in machine-readable code and configured to run on the node 24h or a separate processing device (not shown). In still another embodiment, the system 30 can be implemented in a combination of dedicated hardwired circuitry and machine-readable code.

The system 30 illustratively includes a electronic memory 32 and a module 34 defining a determination module communicatively linked to the memory. At least one data structure resides at the memory 32, the data structure being based upon a router table for classifying data packets in accordance with rules specified by the router table.

According to one embodiment of the present invention, the data structure residing at the memory 32 is a Prefix In B-Tree (PIBT) data structure. As described herein, a PIBT data structure is a data structure that can be represented as a B-tree comprising one or more linked nodes, each node of the PIBT data structure having the following form:

$$t, child_0, (key_1, child_1), \ldots, (key_t, child_t),$$

where t, as well as each $child_i$, and each $key_i$ represent numerical values that can be represented, for example, in binary form and stored in an electronic element of the memory 32. The value of t varies according to the number of keys the node has. Each key, $key_i$, corresponds to an endpoint of a range of a filter contained in the router table. Each filter is represented by a binary string, such as 10111 or 001*, which defines a prefix, the prefix thus being the binary representation of a filter.

More particularly, with respect to the PIBT data structure, each $key_i$ corresponds to the i-th key contained in the node such that $key_1 < key_2 < \ldots < key_t$. Each $child_i$ is a pointer that provides a logical link to an i-th subtree of the PIBT data structure stored in the memory 32. In case of ambiguity, the notation of $x.key_i$ and $x.child_i$ can be used to identify the i-th key and i-th child of an individual node x.

An interval, int(x), is associated with each node x of the PIBT data structure stored in the memory 32. For example, if x is the root node, then $int(x)=[0, 2^w-1]$, which spans or covers the entire address space range. For any node, x, an interval $int_i(x)$ corresponds to an interval within the destination address space between two successive keys, $key_i$ and $key_{i+1}$. By definition, $$int_i(x) = int(child_i) = [key_i, key_{i+1}].$$

Relatedly, for each node, x, of the PIBT data structure, $key_0 = start(int(x))$ and $key_{t+1} = finish(int(x))$.

Referring now to FIG. 2, an exemplary router table 200 is illustrated. Each rule or entry of the router table 200, as shown, is a binary string, or prefix. The router table 200 is shown along with the initial and terminal endpoints of the range corresponding to each prefix. For example, if the maximum length of a prefix is five bits, then the range of the prefix P1=001* spans from 00100 to 00111. Thus, it covers the interval from $(00100)_2 = 16$ to $(00111)_2$, such that the range of P1 is [16, 19].

Figure 3:
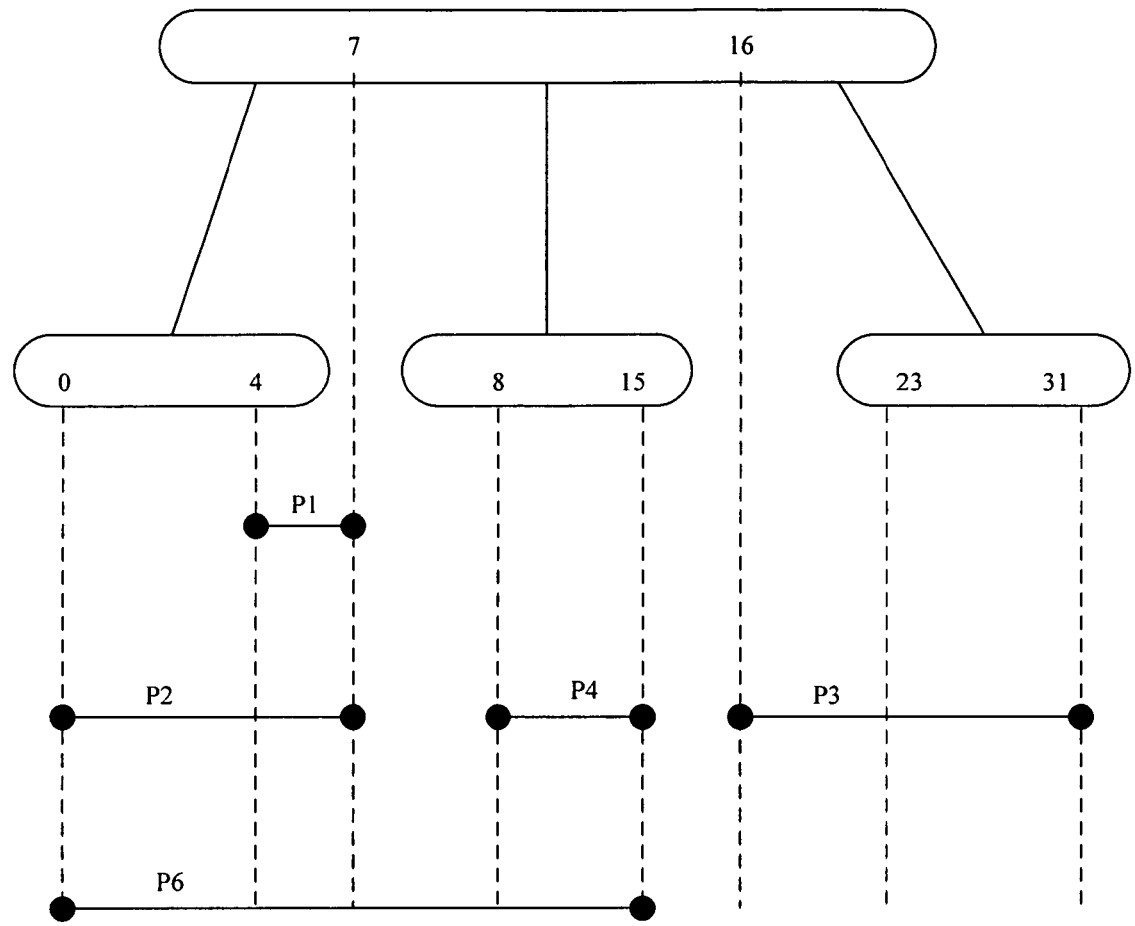
FIG. 3 is a schematic diagram of a data structure according to another embodiment of the present invention.

Referring additionally now to FIG. 3, an exemplary PIBT data structure 300 is shown. The exemplary PIBT data structure 300 is based upon the prefix set P={P1, P2, P3, P4, P5, P6} of the router table 200 shown in FIG. 2. As illustrated, for the PIBT data structure 300 corresponding to the prefix set P, the following elements are obtained: $int(x)=[0, 31]$, $int_0(x)=int(y)=[0, 7]$, $int_1(x)=int(z)=[7, 16]$, $int_2(x)=int(w)=[16, 31]$.

For each node of the PIBT data structure there are t+1 W-bit vectors, $x.interval_i$, $0 \leq i \leq t$ and t W-bit vectors, $x.equal_i$, $1 \leq i \leq t$. The L-th bit of $x.interval_i$ is denoted $x.interval_i[L]$. The bit $x.interval_i[L]=1$ if and only if there is a prefix of length L whose range includes $int_i(x)$ but not int(x). The rule for the interval vectors of the nodes is referred to as a prefix allocation rule. For example, with respect to the exemplary PIBT data structure illustrated in FIG. 3, $y.interval[3]=1$ because prefix P1 has length 3 and because its range is [4, 7], which includes $int_2(y)=[4, 7]$ but not $int(y)=[0, 7]$. Accordingly, P1 is stored in $y.interval_2$ in node y. In general, a prefix may be stored in up to m−1 intervals of a B-tree of order m and in up to 2 nodes at each level of the B-tree.

The L-th bit of $x.equal_i$ is denoted $x.equal_i[L]$. The bit $x.equal_i[L]=1$ if and only if there is a prefix of length L that has a start or finish endpoint equal to $key_i$ of node x. For example, referring still to the exemplary prefix set P of FIG. 2 and the corresponding exemplary PIBT data structure of FIG. 3, $y.equal_1[1]=y.equal_1[2]=1$ since the length of P2 is 2 and that of P6 is 1; each of the other bits of $y.equal_1=1$.

Resources of the memory 32 can be conserved if each leaf node is devoid of a child pointer. Memory accesses are reduced, according to another embodiment, if the child pointers and interval vectors are interleaved so that a $child_i$ and intervals can be accessed with a single cache miss, provided that cache lines are long enough.

The determination module 34, according to this same embodiment, comprises a longest matching prefix (LMP) determination module for determining an LMP. In determining the LMP, the determination module 34 initially constructs a W-bit vector, designated herein as a matchVector. If the router table does not contain a prefix having either a start or a finish endpoint equal to a destination address D for which a match is sought, the constructed W-bit matchVector has a bit designated matchVector[L] that is equal to one; that is, matchVector[L]=1. The matchVector[L] equals one if and only if there is contained in the set of predetermined prefixes, P, a prefix having a length L and matching D. Otherwise, matchVector[L]=1 if and only there is a prefix contained in the set of predetermined prefixes, P, that has a length L and has either a start or finish endpoint that equals D. The maximum L for which matchVector[L]=1 is a length designated l mp(d).

The determination module 34 can be implemented with one or more dedicated hardwire circuits or, alternatively, with software-based instructions in the form of machine-readable code that runs on a processor, such as a microprocessor, connected to the memory 32. Alternately, the determination module 34 can comprise a combination of dedicated hardwire circuitry and software-based processing instructions. The following algorithm exemplifies the operative performance of the determination module 34 in determining an LMP:

```
Algorithm lengthOflmp(d) {
    //return the length of the longest prefix that matches d
    matchVector = 0;
    x = root of PIBT;
    while (x ≠ null) {
        Let t = number of keys in x;
        Let i be the smallest integer such that x.key_{i-1} ≦ d ≦ x.key_i,
        1 ≦ i ≦ t + 1;
        if (i ≦ t && d == x.key_i) {
            matchVector = x.equal_i;
            break;}
        matchVector |= x.interval_{i-1};
        x = x.child_{i-1};
    }
    return Largest L such that matchVector[L] = 1;
}.
```

Figure 4:
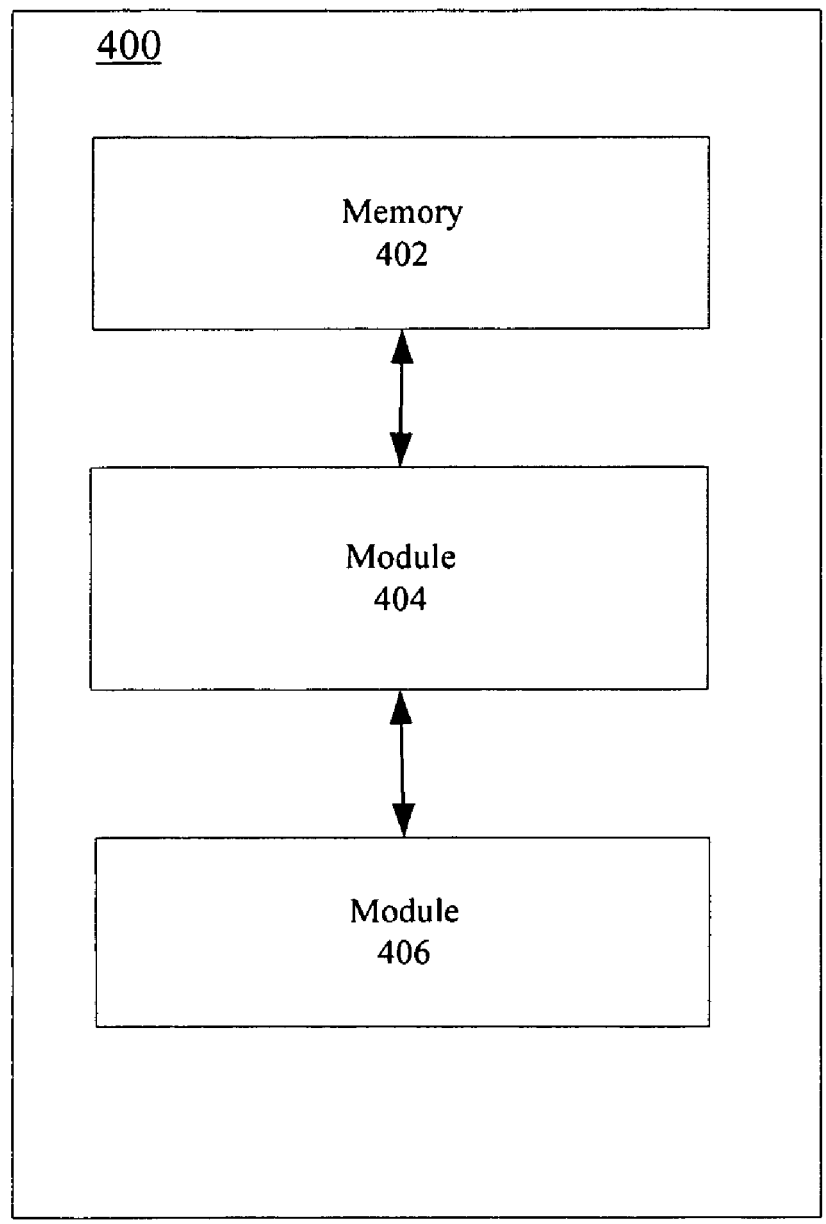
FIG. 4 is a schematic diagram of a system according to yet another embodiment of the present invention.

FIG. 4 illustrates a system 400 for classifying data packets according to another embodiment. The system 400 includes a memory 402, a determination module 404 connected to the memory for determining an LMP, and an additional module defined herein as an update module 406 for accommodating modifications to the rule table underlying a PIBT data structure residing at the memory.

The update module 406 also can be implemented with one or more dedicated hardwire circuits or, alternatively, with software-based instructions in the form of machine-readable code that runs on a processor, such as a microprocessor, connected to the memory 402. Alternately, the update module 406 can comprise a combination of dedicated hardwire circuitry and software-based processing instructions.

An addition of a new prefix, p, to the table is accommodated by the update module 406 performing a prefix insert. The prefix insert operation modifies the PIBT data structure stored in the memory 402. The PIBT data structure is modified by the update module 406 performing an endpoint insert operation. The endpoint insert operation comprise inserting a start point, start(p), corresponding to the initial point of the range of p, and updating the corresponding W-bit equality vector. If the start and finish points of the range of p are not equal, the PIBT is further modified by the update module 406 inserting a finish point, finish(p), corresponding to the terminal point of the range of p, and updating the corresponding equality vector. If finish(p) is already contained in the PIBT data structure stored in the memory 402, then only the corresponding equality vector is updated by the update module 406. Finally, each of the interval vectors is updated by the update module 406 in accordance with the prefix allocation rule described above.

According to one embodiment, the update module 406 inserts an endpoint, u, into the PIBT data structure stored in the memory 402, this endpoint insert operation being performed according to an algorithm described herein. The algorithm begins with the update module 406 performing a search of the PIBT data structure for a key equal to u. If u is already contained in the PIBT data structure, the corresponding equality vector is updated by the update module 406 to account for the new prefix, p, which alternatively begins or ends at u and which has a length given by length(p). If the length(p) bit of the equality vector is already equal to one, then the prefix p is a duplicate prefix.

If, however, u is not already contained in the PIBT data structure stored in the memory 402, the update module 406 terminates the search for u at a leaf, x, of the PIBT data structure. If t is the number of keys in x, then the update module 406 inserts endpoint u into node x between $key_{i-1}$ and $key_i$, where $key_{i-1} < u < key_i$. The ordered sequence of keys, accordingly, is updated as follows:

$$key_1, \ldots, key_{i-1}, u, key_i, \ldots, key_t.$$

The interval vector sequence is updated by the update module 406 accordingly:

$$interval_0, \ldots, interval_{i-1}, interval_{i-1}, interval_i, \ldots, interval_t.$$

Only the bit in the length(p) position of the equality vector associated with u equals one. the insertion of u splits the original $int_{i-1}$ into two intervals: $[start(int_{i-1}), u]$ and $[u, finish(int_{i-1})]$. Furthermore, the original W-bit vector, $interval_{i-1}$, is the interval vector for each of these two intervals if the new prefix, p, is taken into account. The original W-bit internal vector, $interval_{i-1}$, can be replicated in O(1) time so that separate copies of the interval vector are generated for each of the two new intervals.

When t<m−1, the described insertion of u, the creation of the equality vector corresponding to u, and the replication of $interval_{i-1}$, together with an incrementing of the value t representing a count of the number of keys for the node x, completes the insertion of u into the PIBT stored in the memory 402. When t=m−1, the described operations on x yield a node that has 1 key more than its capacity, m−1. The format of the node x, accordingly, is:

$$m, key_1, \ldots, key_m, interval_0, \ldots, interval_m.$$

(The $child_i$ pointers and equality vectors, equals, are not here shown.). Node x is split into two around $key_g$, where g=[m/2]. Keys to the left of $key_g$ (along with the associated equality and interval vectors remain in node x). Keys to the right of are placed into a new node y, and the 3-tuple ($key_g$, $equal_g$, y) is inserted into the parent of x. If x' denotes the new, then x' has g−1 keys while y has m−g keys. The formats of node x' and y, respectively, are:

$g-1, key_1, \ldots, key_{g-1}, interval_0, \ldots, interval_{g-1}$ and, $m-g, key_{g+1}, \ldots, key_m, interval_g, \ldots, interval_m$.

Figure 5:
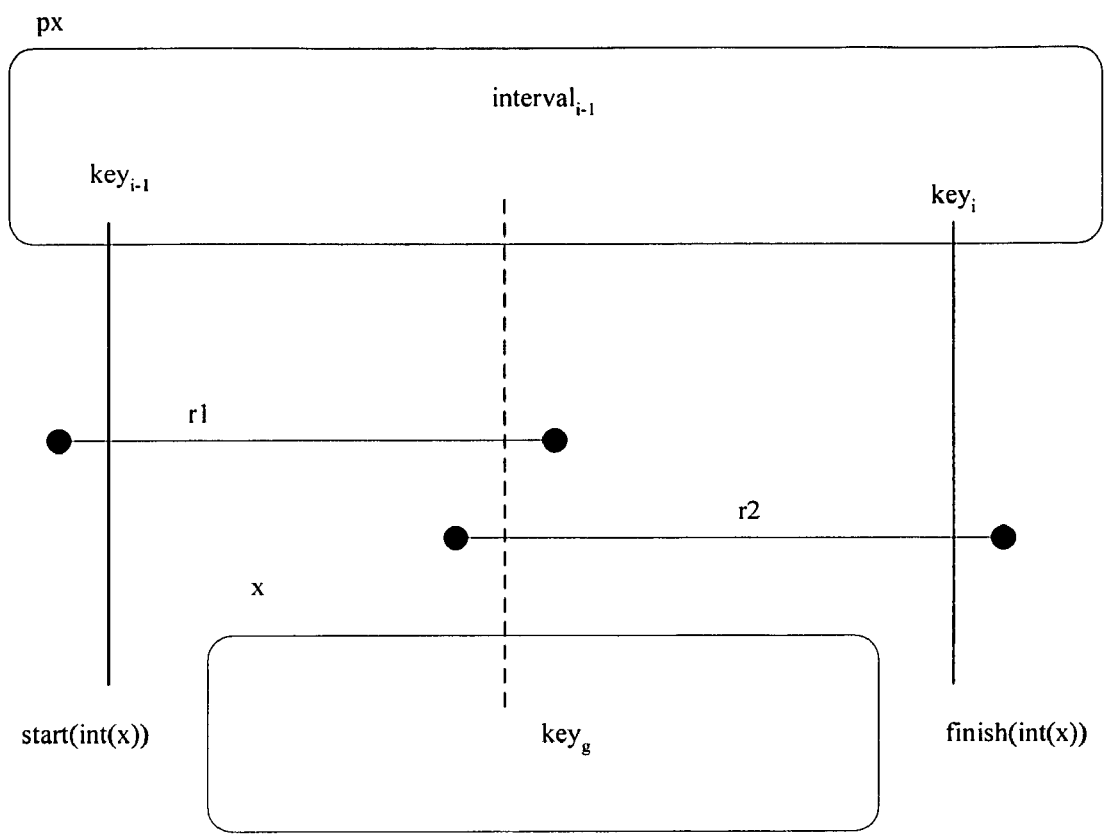
FIG. 5 is a schematic diagram of a procedure effected by a system according to still another embodiment of the present invention.

Before proceeding to insert the 3-tuple ($key_g$, $equal_g$, y) into the parent of node x, the update module 406 adjusts the interval vectors in nodes x and y to account for the fact that int(x') and int(y) are not identical to int(x). The adjustment, in the form of a node splitting operation 500, is illustrated in FIG. 5. As shown, prefixes such as r1 that include the range int(x')=[start(int(x)), $key_g$] are removed by the update module from the intervals contained in node x' and inserted into an interval vector in the corresponding parent node. Prefixes such as r2 that include int(y)=[$key_g$, finish(int(x))] are removed from the intervals of y by the update module 406 and inserted by the update module into a parent node interval, as illustrated.

The following algorithm exemplifies the operative performance of the update module 406 in implementing an endpoint insertion operation for inserting the endpoint u into a leaf node, x, of the PIBT data structure. The update module 406 performs the endpoint insertion operation while performing node splits as needed. It is assumed that $x.key_{i-1} < u < x.key_i$. The endpoint insertion procedure, as illustrated by the algorithm, returns a bit vector designated internalVector that contains prefixes that include or match the range [s, f].

```
Algorithm insertEndPoints(u, x, i) {
//insert u, u = start(p) or u = finish(p) into the leaf node, x,
x.key_{i-1} :< u < x.key_i
leftBits = rightBits = 0; // carry over prefixes from children
child = null; // right child of u
eq = equal bit-vector with 1 at position length(p); // p is insert prefix
do {
  right shift the keys, child pointers, equal vectors, and interval vectors
    of x by 1 beginning with those at position i;
  insert u as the new key_i;
  equal_i = eq;
  child_i = child;
  interval_i = interval_{i-1} | rightBits;
  interval_{i-1} | leftBits;
  if (x has less than m keys) return;
  //node overflow, split x
  g = [m/2];
  keyg = key_g;
  Split x into the new x (i.e., x') and y as described above;
  // adjust interval vectors in x and y
  leftBits = matchingPrefixVector(start(int(x)), u, x.interval_0);
  for (j = 0; j ≤ g; j + +)
    x.interval_j & = ¯leftBits; // remove from x.interval_j
  rightBits = matchingPrefixVector(u, finish(int(y)), y.interval_0);
  for (j = 0; j ≤ m-g; j + +)
    y.interval_j & = ¯rightBits;// remove from y.interval_j
  u = keyg; child = y;
  eq = equal vector of key_g;
  x = parent(x);
  Set i so that x.key_{i-1} < u < x.key_i;
} while (x! = root);
// create a new root
New root r has a single key u with equal vector eq;
r.child_0 = old root;
r.child_1 = child;
r.interval_0 = leftBits;
r.interval_1 = rightBits;
}.
```

Following the insertion of the endpoints of the new prefix, p, the update module 406 updates the interval vectors in the nodes of the PIBT data structure to account for the new prefix. In doing so, the update module adheres to the prefix allocation rule described above. An interval vector update operation based on the prefix allocation rule is illustrated by the following algorithm that applies to the PIBT data structure stored in the memory 402:

```
Algorithm updateIntervals(p, x) {
  //use prefix allocation rule to place p in proper nodes
  if (x == null or (int(x) and p have at most one common address)
    or (int(x) contained in p) return;
  Let t be the number of keys in x;
  key_0 = start(int(x)); key_{t+1} = finish(int(x));
  Let i be the smallest integer such that key_i ≥ start(p);
  Let j be the largest integer such that key_j ≤ finish(p);
  x.interval_q[length(p)] = 1, i ≤ q < j;
  if (i > 0) updateIntervals(p, child_{i-1});
  if (j <= t && j ≠ i-1) updateIntervals(p, child_j);
}.
```

Figure 6:
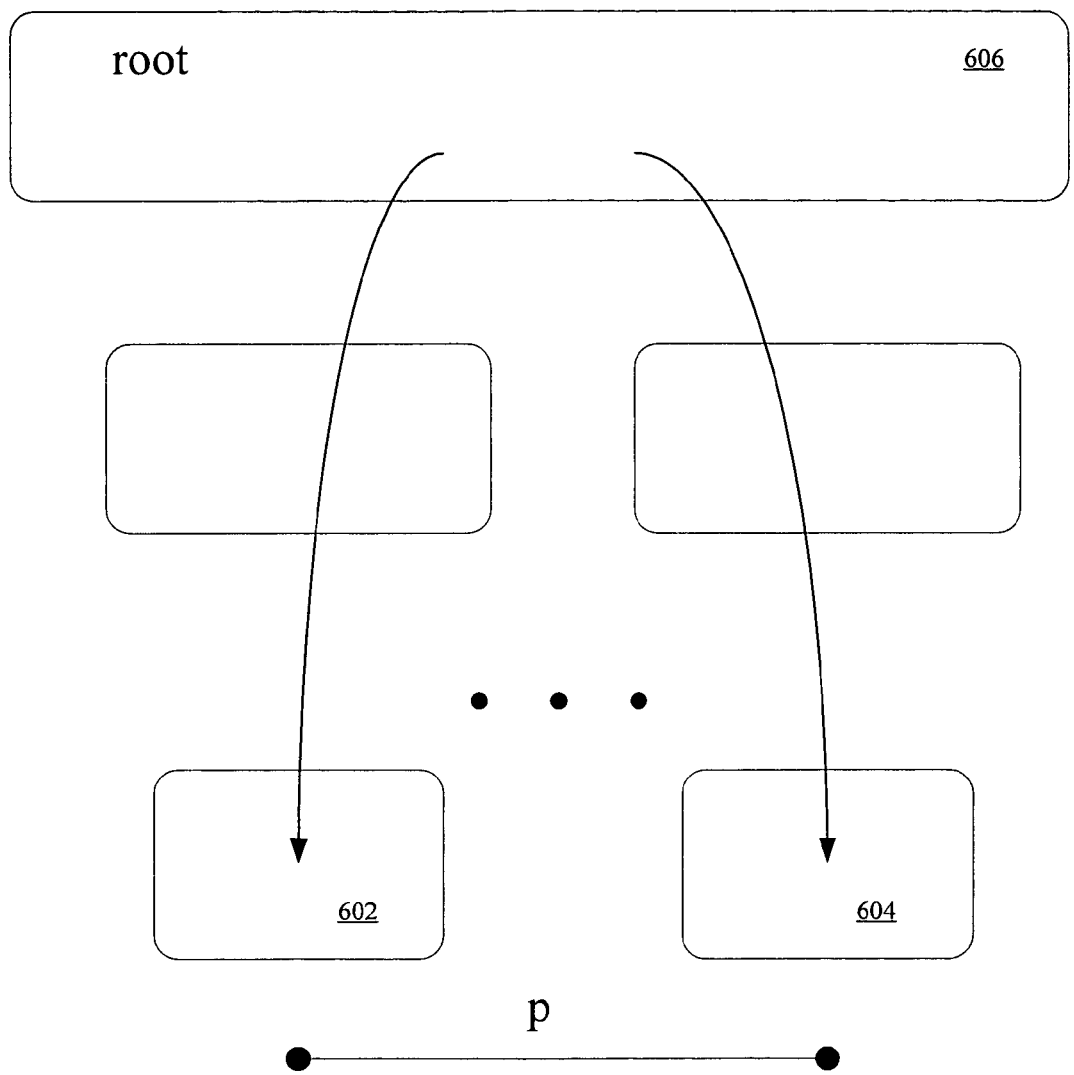
FIG. 6 is a schematic diagram of another procedure effected by a system according to yet another embodiment of the present invention.

At the initial invocation of the procedure, x is the root of the PIBT data structure. The procedure, as exemplified by the interval update algorithm, assumes that p is not the default prefix * that matches all destination addresses. If present, the default prefix * is excluded from the PIBT data structure and stored separately by the update module in the memory 402 allowing it to be handled as a special case. A possible set of nodes 602, 604 visited by x (i.e., the root 606) is illustrated in FIG. 6.

According to another embodiment, the update module 406 modifies the PIBT data structure stored in memory 402 so as to accommodate deletion of a prefix from the rule table. The update module 406 illustratively deletes a prefix, p, by removing p from each of the interval vectors that contain p. The update module additionally updates the equality vector corresponding to start(p) and removes start(p) from the PIBT data structure if its equality vector is now zero. If start(p), corresponding to the start point of the range of p, does not equal finish(p), the corresponding terminal point of the range of p, then the update module 406 updates the equality vector for finish(p) and removes finish(p) from the PIBT data structure if its equality vector is now zero. The first step of the procedure implemented by the update module is similar to that for inserting a prefix, p. The only difference is that instead of setting $x.interval_q[length(p)]$ to one as described above, it is here set equal to zero.

To delete an endpoint, u, the update module 406 first searches the PIBT data structure for the node, x, that contains the endpoint. If x is a leaf of the PIBT data structure and $u=x.key_i$, then, since u is not an endpoint of a prefix, $x.interval_{i-1}=x.interval_i$ and $x.equal_i=0$. The update module 406 removes $key_i$, $x.interval_i$, $x.equal_i$, and $x.child_i$ from the node x, and shifts the keys to the right of key i together with the associated interval, equality, and child values one position to the left. If the number of keys remaining in node x is at least [m/2] (or, if x is the root, 2), then the procedure is complete.

If the previous conditions do not obtain, then node x is deficient, and the update module 406 responds as described herein. If a nearest sibling of x has more than [m/2] keys, x gains or borrows a key that the update module 406 gets from this nearest sibling. Otherwise, the update module 406 merges node x with the nearest sibling. The merge can cause px=parent(x) to become deficient, in which event, the deficiency resolution is repeated for px.

Figure 7:
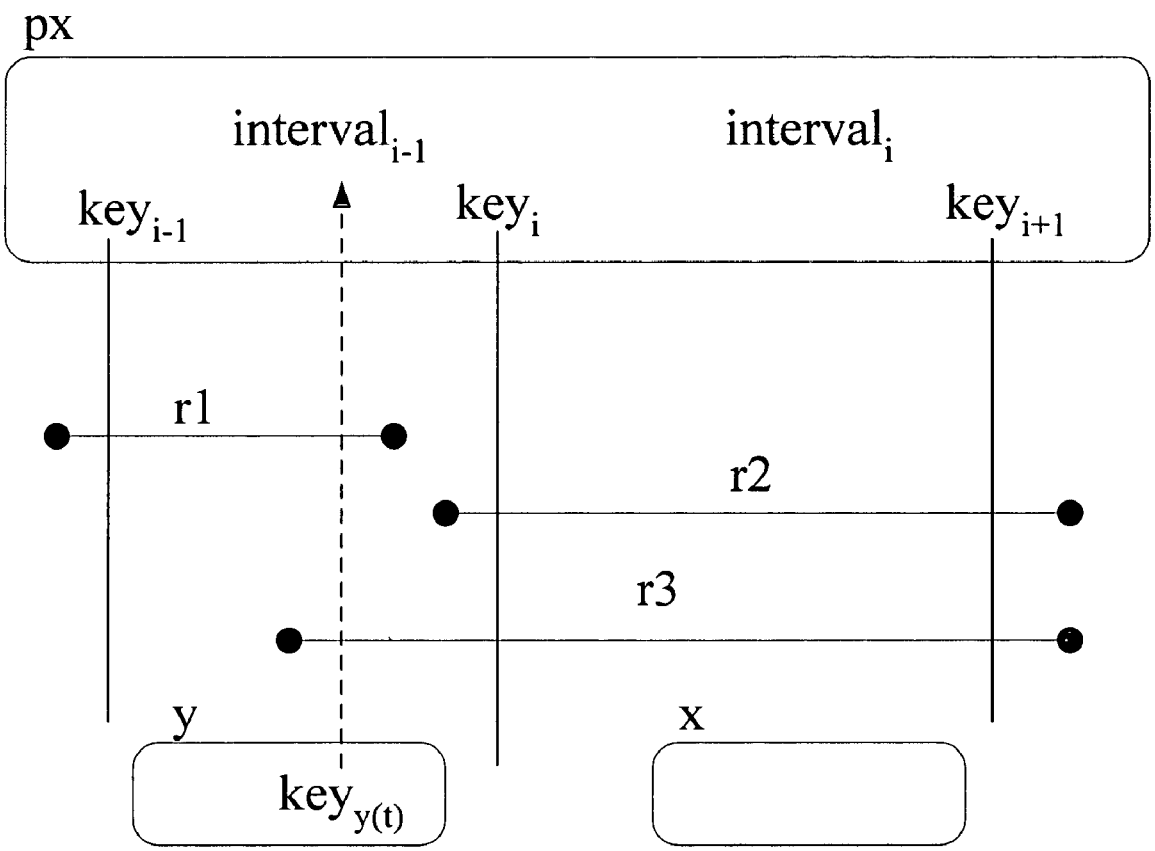
FIG. 7 is a schematic diagram of yet another procedure effected by a system according to still another embodiment of the present invention.

FIG. 7 illustrates the borrow-from-sibling operation 700 in the exemplary case of node x having a nearest left sibling, node y, that has more than [m/2] keys. $Key_{t(y)}$ illustratively denotes the largest, or rightmost, key in node y, and $px.key_i$ is illustratively the key in px such that $px.child_{i-1}=y$ and $px.child_i=x$; that is, $px.key_i$ is the key in px that is between y and x.

Illustratively, update module 406 replaces px, $key_i$, and equals with $key_{t(y)}$ and its associated equality vector. In node x, all keys and associated vectors and child pointers are shifted right one place by the update module 406. The update module converts $y.child_{t(y)}$, $y.interval_{t(y)}$, $px.key_i$, and $px.equal_i$, respectively, to $x.child_0$, $x.interval_0$, $x.key_0$, and $x.equal_0$. The update module 406 removes from the intervals of y the prefixes that include the range [px. $key_{i-1}$, $key_{t(y)}$] and adds the removed prefixes to $px.interval_{i-1}$. The update module 406 removes from $px.interval_i$ those prefixes that do not include the range [$key_{t(y)}$ px. $key_{i+1}$] and adds them to the intervals of node x not including $x.interval_0$. Subsequently, the update module 406 adds all the prefixes originally in $px.interval_{i-1}$ to $x.interval_0$ (formerly $y.interval_{t(y)}$). Finally, the update module 406 removes from $x.interval_0$ those prefixes that contain the range [$key_{t(y)}$, $px.key_{i+1}$]. Since the removed prefixes are already included in $px.interval_i$, they need not be added again.

Figure 8:
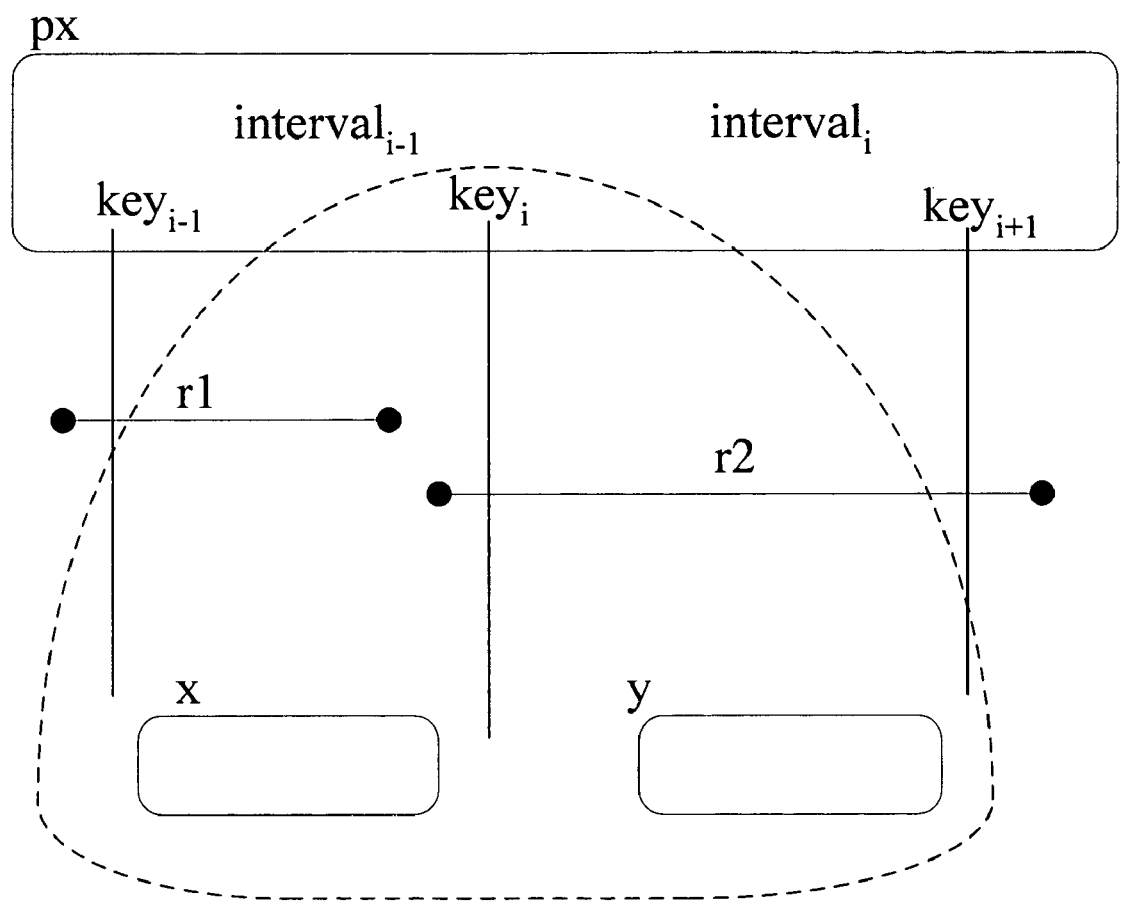
FIG. 8 is a schematic diagram of still another procedure effected by a system according to yet another embodiment of the present invention.

When a node x is deficient and its nearest sibling y has exactly [m/2]−1 keys, nodes x, y and the in-between keys, $px.key_i$, in the parent px are combined into a single node, according to a merge-siblings operation 800 illustrated in FIG. 8. The resulting single node has 2[m/2]−2 keys. According to the merge-siblings operation 800, the prefixes in px.intervali−1 that do not include the range [$px.key_{i-1}$, $px.key_{i+1}$] are removed from $px.interval_{i-1}$ by the update module 406, which adds them to the intervals of node x. The prefixes in $px.interval_i$ that do not include the range [$px.key_{i-1}$, $px.key_{i+1}$] are added to the intervals of y. The update module 406 removes $px.interval_i$ from px. The update module 406 removes $px.key_i$ and its associated equal vector from px and appends it to the right of node x. Subsequently, the update module 406 appends the contents of node y to the right of newly revised node x.

Figure 9:
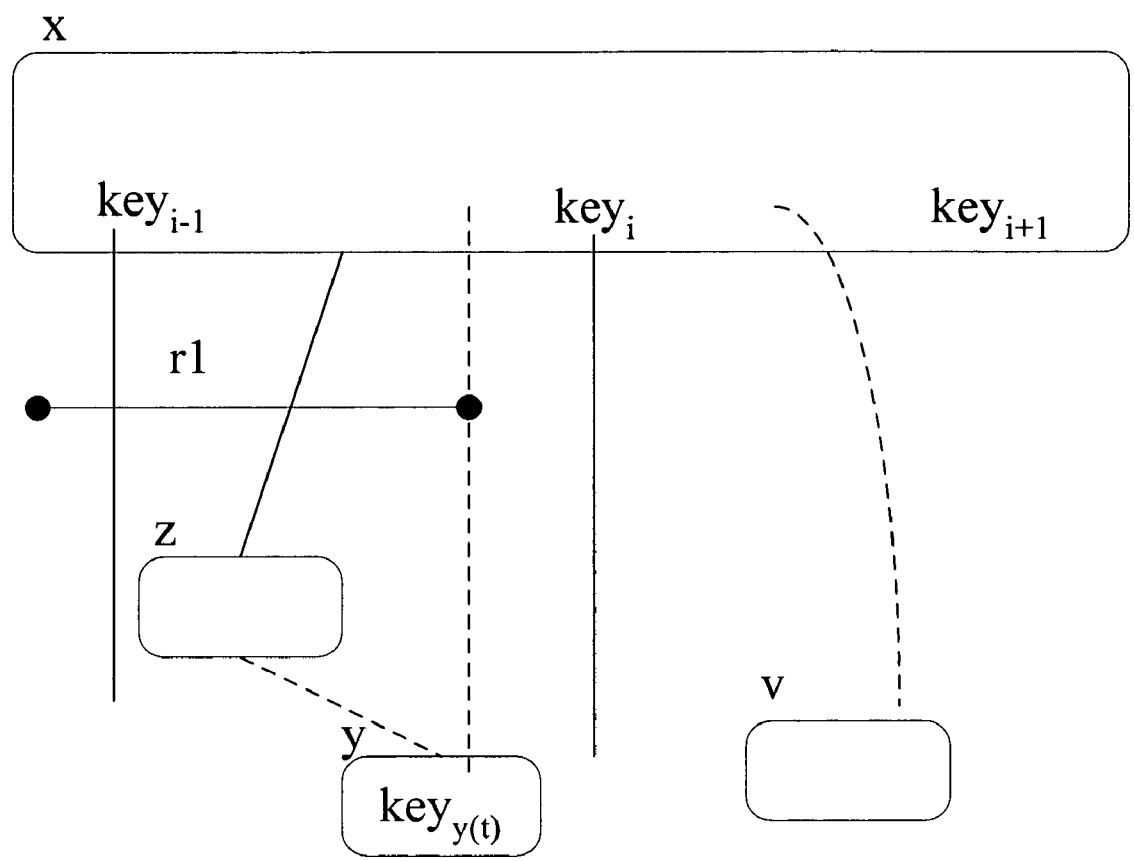
FIG. 9 is a schematic diagram of yet another procedure effected by a system according to still another embodiment of the present invention.

As illustrated in FIG. 9, to delete an endpoint $u=x.key_i$ from a non-leaf node x of the PIBT data structure, the update module 406 performs a non-leaf deletion operation 900, replacing u with either the largest key in the subtree designated $x.child_{i-1}$ or the smallest key in the subtree designated $x.child_i$. As illustrated, $y.key_{t(y)}$ is the largest key in subtree $x.child_{i-1}$. According to the non-leaf deletion operation 900, the update module 406 replaces u with $y.key_{t(y)}$, and also replaces $x.equal_i$ with $y.equal_{t(y)}$. Before proceeding to remove $y.key_{t(y)}$ from the leaf node y, the update module 406 adjusts the interval values of the nodes on the path from x to y. If z, z≠x, is a node on the path from x to y, then, as a result of the relocation of $y.key_{t(y)}$, int(z) shrinks from [start(int(z)), u] to [start(int(z)), $y.key_{t(y)}$]. Accordingly, prefixes that include the range [start(int(z)), $key_{t(y)}$] but not the range [start(int(z)), u] are removed by the update module 406 from the intervals of z and are added to the parent of the node z. Since there are no endpoints between $y.key_{t(y)}$ and $u=x.key_i$, these prefixes that are to be removed from the intervals of z are assigned $y.key_{t(y)}$ as an endpoint. More particularly, these prefixes finish at $y.key_{t(y)}$.

Still referring to FIG. 9, for each node z, z≠x, on a path from x to a leftmost leaf node, v, in the subtree $x.child_i$, z.int expands from [u, finish(int(z))] to [$y.key_{t(y)}$, finish(int(z))]. Since there is no prefix that has u as its endpoint and since there are no endpoints between u and $y.key_{t(y)}$, no interval vectors on the path from x to v are changed by the update module.

A data structure, according to a different embodiment of the present invention, is a range-in-B-tree (RIBT) data structure. The RIBT data structure is also used for classifying data packets transmitted over a data communications network based upon a set of predetermined prefixes associated with the destination addresses of the data packets. More particularly, the RIBT data structure can be used for dynamic router-tables comprising filters that have non-intersecting ranges.

Figure 10:
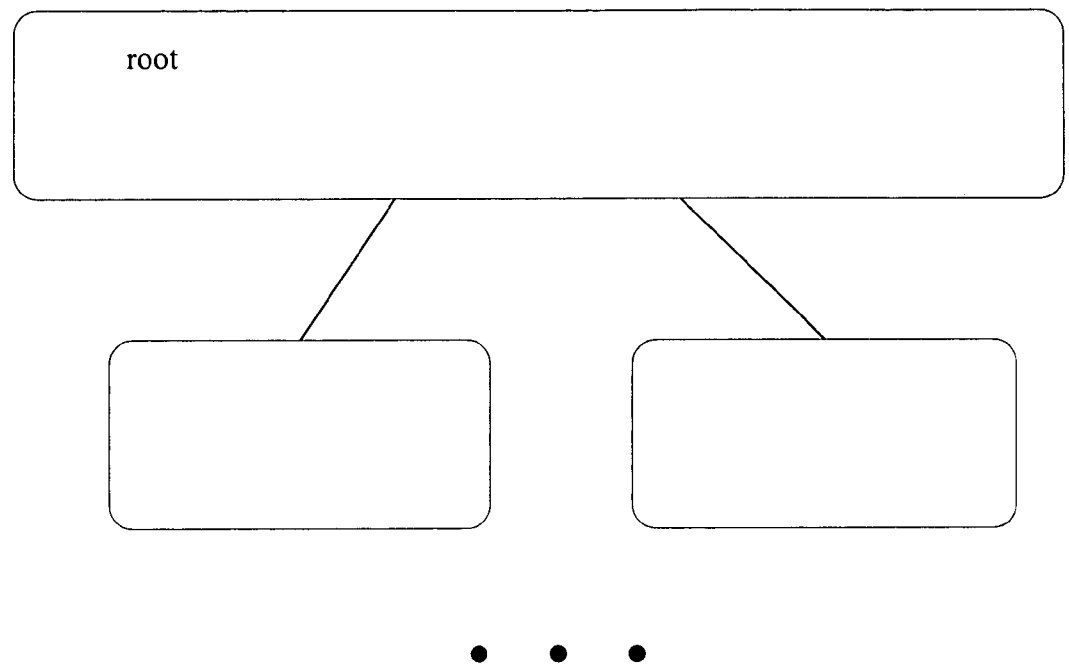
FIG. 10 is a schematic diagram of a data structure according to yet another embodiment of the present invention.
Figure 10:
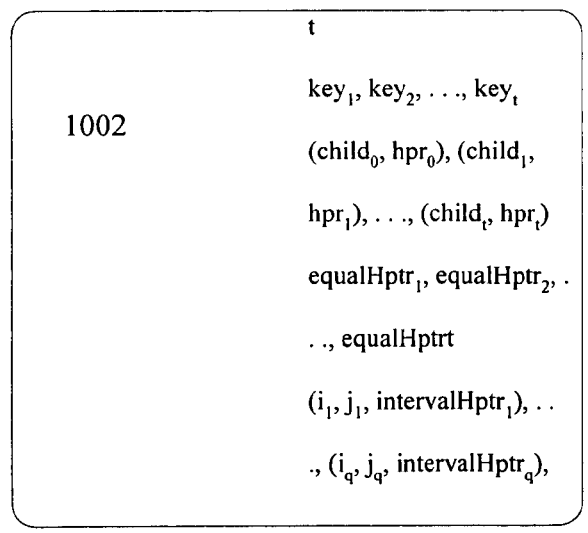

FIG. 10 provides an illustration of a general structure of an RIBT data structure 1000. The RIBT data structure 1000 comprises a B-tree that includes a plurality of nodes having distinct range-endpoints. For each node, x, of the RIBT data structure 1000, x.int and $x.int_i$ are defined as they were with respect to the PIBT data structure 1000. For each endpoint $x.key_i$ in a node, x, there is stored in memory a heap, defining a max-heap, designated $H_i$, of ranges that have $x.key_i$ as an endpoint. Ranges r having an initial, point start(r), and terminal point, finish(r), are uniquely stored in a heap defining an equality heap, designated an equalH heap.

Other ranges are stored in other equalH heaps as well as in interval max-heaps, designated as intervalH heaps, which are the counterparts of the interval vectors in the PIBT data structure. An RIBT node that has t keys has t intervalH max-heaps. The ranges stored in these max-heaps are determined by a range allocation rule that is similar to the prefix allocation rule used for the PIBT data structure; that is, a range r is stored in an intervalH max-heap of node x if and only if r includes $x.int_i$ for some i but does not include x.int. As with the PIBT data structure, each range is stored in the intervals max-heaps of at most 2 nodes at each level of the RIBT data structure 1000.

The set of ranges stored in a node, x, of the RIBT data structure 1000 is designated set(x). Each range r contained in set(x) is stored in exactly one intervalH max-heap of the node x. An index (i,j) is assigned to each range r in set (x), such that $x.key_{i-1} < start(r) \leq x.key_i$ and $x.key_j \leq finish(r) x.key_{j+1}$, where $x.key_{-1}=\infty$, $x.keyt+2=\infty$, and t is the number of keys in the node x. Ranges of the set(x) that have the same index are stored in the same intervalH max-heap. Thus, an index (i, j) is assigned to each intervalH max-heap, (i, j) being the index of the ranges in that max-heap.

The structure of each RIBT node, as exemplified by node 1002 in FIG. 9, having t keys and q≦t intervalH max-heaps, is:

t $key_1, key_2, \ldots, key_t$ $(child_0, hpr_0), (child_1, hpr_1), \ldots, (child_t, hpr_t)$ $equalHptr_1, equalHptr_2, \ldots, equalHptrt$ $(i_1, j_1, intervalHptr_1), \ldots, (i_q, j_q, intervalHptr_q)$, where hprs is the hightest-priority range in set(x) that matches x.intx, equalHptrs is an equality heap pointer (a pointer to equalHs), and intervalHptrs is an interval max-heap pointer (a pointer to the intervalH max-heap whose index is $(i_s, j_s)$). The following is an algorithm for finding the highest-priority range that matches a destination address d. As illustrated the operation determines a highest-priority range (HRP) by generating a multi-bit vector defining an hp vector:

```
Algorithm hp(d) {
    // return the priority of the highest-priority range that matches d
    hp = −1; // assume that all priorities are ≧ 0
    x = root of RIBT;
    while (x ≠ null) {
```

-continued

```
        Let t = number of keys in x;
        Let i be the smallest integer such that x.key_{i-1} ≦ d ≦ x.key_i.
        if (i ≦ t && d == x.key_i)
            hp = max{hp, highest priority in x.equalH_i};
        hp = max{hp, hpr_{i-1}};
        x = child_{i-1};
    }
    return hp;
}.
```

As already noted, the present invention can be realized in hardware, software, or a combination of hardware and software. Accordingly, the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the procedures and methods described herein, and which when loaded in a computer system is able to carry out these procedures and methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

That claimed is:

1. A computer-based system including a memory and one or more processors for classifying data packets transmitted over a data communications network based upon a set of predetermined prefixes associated with destination addresses of the data packets, the system further comprising:
    a data structure stored in the memory and comprising of at least one of a prefix-in-B-tree (PIBT) data structure and a range-in-B-tree (RIBT) data structure, the at least one data structure comprising a plurality of nodes based upon the set of predetermined prefixes, the PIBT and the RIBT data structure being B-trees of order m, wherein m>2, wherein the B-tree comprise a root node having at least two children, internal nodes that each have between ceil (m/2) and m children wherein ceil is defined as the ceiling function which round up an integer value, and external nodes having no children, wherein all external nodes of the PIBT and the RIBT data structure are at the same level; and
    a determination module configured to execute on the one or more processors, wherein the determination module determines a match between at least one of the plurality of nodes and a destination address of a particular data packet.

2. The computer-based system of claim 1, wherein the data structure comprises a PIBT data structure and wherein the determination module determines a longest-matching-prefix (LMP).

3. The computer-based system of claim 2, wherein the determination module generates a multi-bit vector defining a match Vector for determining the LMP.

4. The computer-based system of claim 1, wherein the data structure comprises a RIBT data structure and wherein the determination module determines a highest-priority range (HPR) that matches the destination address.

5. The computer-based system of claim 1, further comprising an update module for modifying the data structure in response to a change in the set of predetermined prefixes.

6. The computer-based system of claim 5, wherein the update module modifies the data structure by performing a prefix insert or prefix delete operation.

7. The computer-based system of claim 6, wherein the prefix insert operation comprises performing at least one of an endpoint insert operation, a node splitting operation, and a interval vector update operation.

8. The computer-based system of claim 5, wherein the prefix delete operation comprises performing at least one of an endpoint delete operation, a borrow-from-sibling operation and a merge-siblings operation.

9. A computer-based system including a memory and one or more processors for classifying data packets transmitted over a data communications network, the system further comprising:
    a prefix-in-B-tree data structure stored in the memory and accessible to the one or more processors for classifying data packets transmitted over a data communications network based upon a set of predetermined prefixes associated with destination addresses of the data packets and defining a plurality of endpoints, the data structure comprising:
    a B-tree comprising a plurality of nodes including a parent node, and at least one node defining a child of the parent node;
    a plurality of keys forming an ordered sequence, each key uniquely corresponding to one of the plurality of endpoints and contained in only one of the plurality of nodes; and
    a plurality of intervals, each interval being associated with one of the plurality of nodes and corresponding to a portion of an address space defined by the set of predetermined prefixes and lying between two successive keys in the parent node;
    wherein a search of the data structure for a key corresponding to one of the endpoints being completed prior to reaching a leaf node.

10. The computer-based system of claim 9, wherein each interval associated with the parent node, x, comprises an i-th portion of the interval, $int_i(x)$, which is coextensive with an interval, $int(child_i)$ associated with an i-th child of the parent node such that $int_i(x)=int(child_i)$.

11. The computer-based system of claim 9, wherein the data structure further comprises:
    a plurality of multi-bit interval vectors, each of the plurality of nodes having a number of multi-bit interval vectors equal to its degree, wherein bit j of a multi-bit interval vector identifies the presence of a prefix of length j with a range including the interval represented by the interval vector; and
    a plurality of multi-bit equality vectors, each of the plurality of nodes having a number of multi-bit equality vectors equal to the number of keys in that node, wherein bit j of the i-th multi-bit equality vector in a node identifies the presence of a prefix of length i that has a start or end point equal to the i-th key in that node.

12. The computer-based system of claim 11, wherein the multi-bit interval vectors are adjusted based on an addition or deletion of a prefix to the data structure.

13. The computer-based system of claim 12, wherein the B-tree further comprises a root node having at least 2 children, internal nodes having between ceil(m/2) and m children, and external nodes having no children, wherein m>2, wherein all external nodes are at the same level, wherein each internal node has a number of keys that is one less than its number of children, wherein each internal node has a number of keys that is one less than its degree, and wherein the interval associated with the root node is the entire address space.

14. A computer-based system including a memory and one or more processors for classifying data packets transmitted over a data communications network, the system further comprising:

a range-in-B-tree data structure stored in the memory and accessible to the one or more processors for classifying data packets transmitted over a data communications network based upon a set of predetermined prefixes associated with destination addresses of the data packets and defining a plurality of end points, the data structure comprising:

a B-tree comprising a plurality of nodes and a predefined value m, wherein m>2 wherein a root node of the B-tree has at least 2 children internal nodes have between ceil (m/2) and m children wherein ceil is defined as the ceiling function which round up an integer value, wherein all external nodes are at the same level, and wherein each internal node has a number of keys that is one less that said internal number of children;

a plurality of keys forming an ordered sequence, each key uniquely corresponding to one of the plurality of endpoints and contained in only one of the plurality of nodes;

a plurality of equality max-heaps, each equality max-heap being associated with exactly one of the plurality of keys; and a plurality of interval max-heaps, each interval max-heap being defined by two end points.

15. The computer-based system of claim 14, wherein the equality max-heaps have one node for each range that has an end point equal to the key associated with that max-heap, each equality max-heap being a priority queue based on range priorities, the number of equality max-heaps in the B-tree node being equal to the number of keys in that node.

16. The computer-based system of claim 14, wherein ranges are assigned to interval max-heaps using a range allocation rule, each interval max-heap being a priority queue based on range priorities, the number of interval priority queues in a B-tree node not exceeding the number of keys in that node.

* * * * *

UNITED STATES PATENT AND TRADEMARK OFFICE
CERTIFICATE OF CORRECTION

PATENT NO. : 7,633,886 B2  
APPLICATION NO. : 11/027164  
DATED : December 15, 2009  
INVENTOR(S) : Sartaj Kumar Sahni et al.

Page 1 of 2

It is certified that error appears in the above-identified patent and that said Letters Patent is hereby corrected as shown below:

Title page, Abstract,
Line 4, "The includes a data structure" should read --This includes a data structure--.

Column 2,
Line 41, "prefixes" should read --prefixes.--.

Column 3,
Line 30, "such a local" should read --such as a local--.
Line 56, "a electric memory" should read --an electric memory--.

Column 5,
Lines 4-5, "a child$_i$ and intervals can" should read --a child$_i$ and interval$_i$ can--.
Line 19, "if and only there is" should read --if and only if there is--.

Column 6,
Line 41, "u equals one. the" should read --u equals one. The--.
Lines 45-46, "internal vector" should read --interval vector--.
Line 60, "vectors, equals, are not here" should read --vectors, equal$_i$, are not here--.

Column 9,
Line 5, "equals with" should read --equal$_i$, with--.
Line 28, "px.intervali-1" should read --px.interval$_{i-1}$--.

Column 10
Line 27, "intervals max-heaps" should read --intervalH max-heaps--.
Line 34, "where x.key$_{-1}$ =∞," should read --where x.key$_{-1}$= -∞,--.
Line 48, "..., equalHptrt" should read -- ..., equalHptr$_t$--.

Signed and Sealed this  
Twelfth Day of July, 2011

David J. Kappos  
*Director of the United States Patent and Trademark Office*

Column 13,
Line 29, "wherein m>2 wherein" should read --wherein m>2, wherein--.

Column 14,
Line 1, "2 children internal nodes" should read --2 children, wherein internal nodes--.
Line 2, "m children wherein" should read --m children, wherein--.
Line 6, "one less that said" should read --one less than said--.